United States Patent Office 3,315,272
Patented Apr. 25, 1967

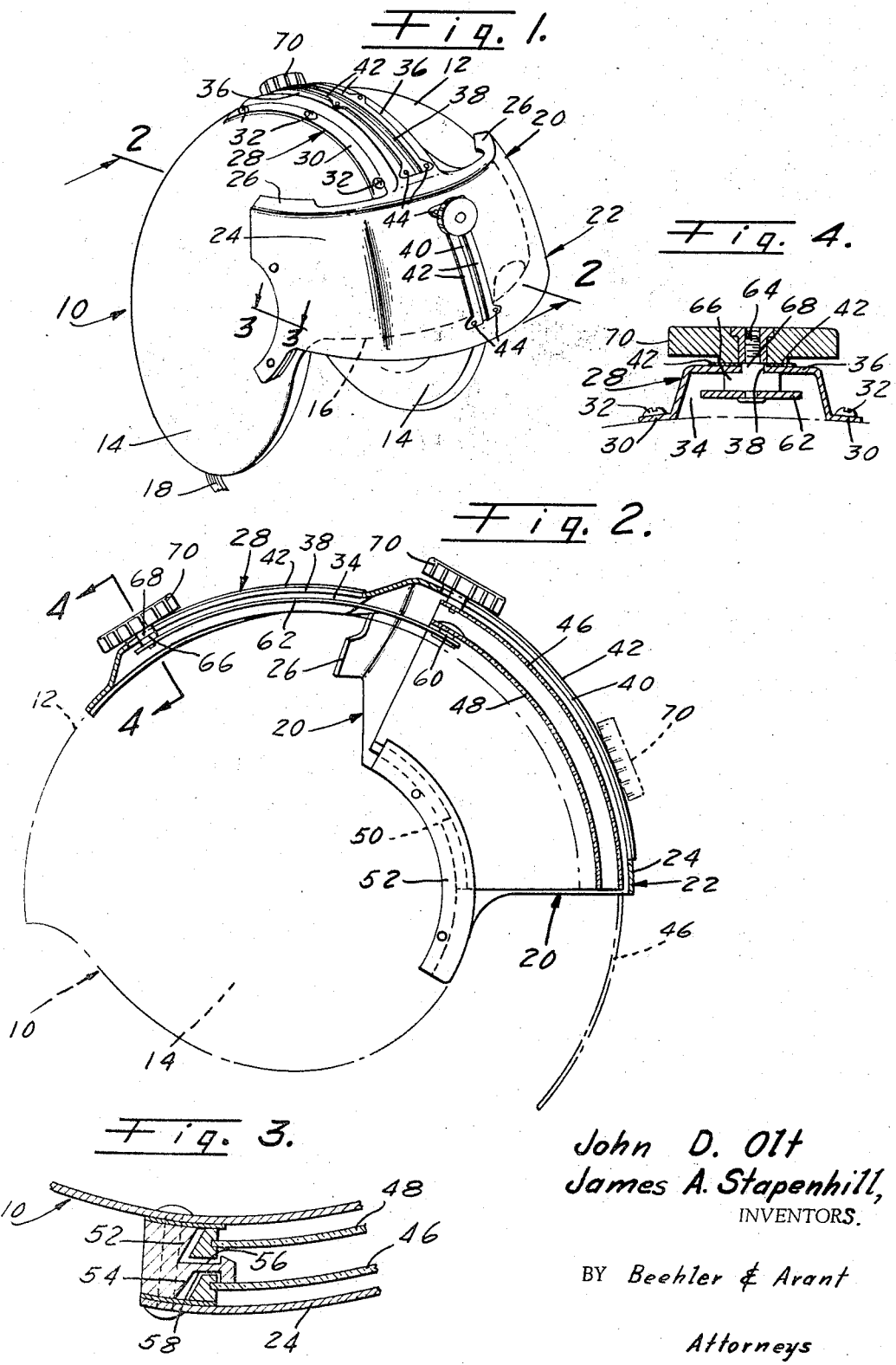

3,315,272
DUAL VISOR HELMET
John D. Olt, Sierra Madre, and James A. Stapenhill, Azusa, Calif., assignors to Sierra Engineering Company, Sierra Madre, Calif., a corporation of California
Filed Dec. 7, 1964, Ser. No. 416,480
12 Claims. (Cl. 2—3)

This invention relates generally to protective head gear and has particular reference to improvements in visors for protective helmets and the like.

There are currently available on the market various types of protective gear for the eyes and head. Some eye protectors and head protectors, for example, are designed to be worn separately. In other cases, the eye protector and head protector, while separately constructed to permit them to be worn separately, may, as well, be worn at the same time, so as to protect both the eyes and head of the wearer. Yet other types of protective gear for the purpose described provide both head protection and eye protection. One example of such combined protective gear is a helmet with a visor. It is this latter type of protective head gear to which this invention is directed.

Some helmet visors are designed to serve only as physical barriers for shielding the face and/or the eyes of the wearer against wind, particles in the air, or other physical elements which would tend to interfere with the vision or activity of the wearer. Protection of this type is desirable, for example, for motorcyclists and other persons whose activity exposes them to high velocity air flow. The primary design consideration for visors of this type is structural strength. Such visors may comprise a clear plastic or glass which is sufficiently thick and rigidly mounted to withstand the wind forces imposed thereon. Another type of helmet visor is intended to serve primarily as a light barrier, or filter, for shielding the eyes of the wearer against glare from an external light source, such as the sun. In this case, the primary design consideration of the visor is its light transmission characteristics. Visors for this purpose may comprise a tinted plastic or glass capable of attenuating the light rays passing through the visor to an intensity level compatible with eye comfort without interfering with the normal vision of the wearer. Most helmet visors, however, are intended to serve both as physical barriers and as a light filter. The existing tinted visors are inherently capable of satisfying these two requirements if they are of sufficient thickness to withstand the wind loads imposed thereon.

At this point, therefore, it is apparent that the existing clear helmet visors are quite satisfactory from the standpoint of shielding the eyes against wind and airborne particles and that the existing tinted visors are satisfactory from the standpoint of shielding the eyes against glare when the ambient light condition is such that the visors attenuate the light transmitted therethrough to a comfortable level of intensity sufficient to provide the wearer with satisfactory vision. The existing visors, however, are deficient in two respects. First, these visors cannot be conveniently applied to existing helmets. In other words, these visors must be incorporated into the helmets at the time of manufacture of the latter. Secondly, the light transmission characteristics of the existing tinted visors are incapable of being changed, with the result that if the ambient light intensity does not fall within the range for which a visor is designed, the intensity of the light transmitted to the eyes of the wearer will be either too high for eye comfort or too low for proper vision. In the event the transmitted light intensity is too low, the wearer may remove the visor and thereby expose his eyes to the elements as well as to the ambient light intensity which, while it is below the intensity range for which the visor is designed, may still exceed the maximum intensity level required for eye comfort. Some helmet visors, for example, are retractible to permit the visors to be moved out of the line of sight of the wearer under these conditions. Alternatively, the wearer may continue to wear the visor and thereby subject himself to any potential hazards which may attend the poor vision occasioned by an ambient light intensity below the intensity range for which the visor is designed. It is apparent, therefore, that each alternative just stated in a compromise having undesirable consequences. There is, accordingly, a need for an improved helmet visor construction which will avoid the above noted and other deficiencies of the existing visor constructions.

It is a general object of this invention to provide such an improved visor construction for helmets and the like.

Another object of the invention is to provide a visor construction for helmets and the like which may be integrally incorporated into the helmet at the time of its manufacture or may be made as an attachment for application to an existing helmet.

Yet another object of the invention is to provide a visor construction for helmets and the like embodying a plurality of separate visor elements, or lenses, as they are sometimes called, having different light transmission characteristics and which may be independently extended into and retracted from the line of sight of the wearer, thereby to alter the effective light transmission characteristic of the visor construction.

A further object of the invention is to provide a visor construction for helmets and the like wherein the visors, or lenses, when retracted, are enclosed in a protective housing which shields the visors against damage.

Yet a further object of the invention is to provide a visor construction for helmets and the like which is relatively simple in construction, easy to manipulate, pleasing in appearance, economical to manufacture, and otherwise well suited to its intended purposes.

Other objects, advantages and features of the invention will present themselves as the description proceeds.

With these and other objects in view, the invention consists in the construction, arrangement of parts, and combination of the various parts of the device, whereby the objects contemplated are attained, as hereinafter set forth, pointed out in the appended claims, and illustrated in the accompanying drawings wherein:

FIGURE 1 is a perspective view of a practical visor construction according to the invention, showing the visor construction mounted on a conventional protective helmet;

FIGURE 2 is an enlarged section taken on line 2—2 in FIGURE 1;

FIGURE 3 is an enlarged section taken on line 3—3 in FIGURE 1; and

FIGURE 4 is an enlarged section taken on line 4—4 in FIGURE 2.

In these drawings, numeral 10 denotes a conventional protective helmet including a generally spherically curved crown 12 and curved lobes 14 depending from the lower edge of the crown, at diametrically opposite sides thereof. When the helmet is placed on the head of a wearer, lobes 14 cover and protect the sides of the head and the ears of the wearer. The forward, downwardly presented edge 16 of the crown 12 and the forwardly presented edges of the side lobes 14 define the front opening in the helmet through which the face of the wearer is exposed. In a typical helmet of the kind illustrated in the drawings, the forward crown edge 16 extends across the forehead of the wearer approximately at the level of the eyebrows. Generally, the helmet is equipped with means for retaining it on the wearer's head. The illustrated helmet is shown to have a chin strap 18 for this purpose.

The improved visor construction of this invention is represented in the drawings as a visor attachment 20 which is secured to the helmet 10 in the manner hereinafter described. The visor construction comprises a housing 22 which is curved in both the horizontal and vertical planes to embrace the forward portion of the helmet crown 12 in the region directly above the forward crown edge 16. This housing has a forwardly presented wall 24 along the upper edge of which is a rearwardly directed flange 26. Flange 26 seats against the outer surface of the helmet crown 12 to space the upper edge of the housing wall 24 from the crown. Integrally joined to and extending rearwardly from the housing flange 26, centrally of its ends, is a visor mounting extension 28. This extension is curved to match the curvature of the helmet crown 12, and is formed, along its side edges, with correspondingly curved flanges 30 which seat against the upper surface of the crown. Flanges 30 are secured to the helmet 10 in any convenient manner, as by screws 32. When the visor construction 20 is properly attached to the helmet 10, the mounting extension 28 is aligned with the fore and after center line of the helmet and the visor housing 24 curves around the front side of the helmet crown 12, from one side of the front face opening in the helmet to the other. The lower edge of the housing is substantially flush with the lower forward edge 16 of the crown.

As illustrated best in FIGURE 4, the mounting extension 28 is generally channel-shaped in transverse cross-section and defines a curved, elongate recess or channel 34 which opens toward the crown 12 of the helmet. In the upper web or wall 36 of the extension 28 is a slot 38 which extends substantially the full length of the extension, along its longitudinal center line. Longitudinally aligned with the mounting extension slot 38 is a slot 40 in the forward wall 24 of the visor housing 22. Slot 40 extends from a position adjacent the lower edge of the housing wall 24 to a position adjacent the upper edge of this wall.

The housing 22 and the mounting extension 28 together constitute the main body of the present visor construction 20. This body may be constructed of various materials. According to the preferred practice of the invention, however, the body is molded from plastic. When the body is thus constructed of plastic, it is desirable, for reasons to be explained presently, to provide metallic wear strips along the sides of the slots 38 and 40. Accordingly, FIGURE 1 illustrates a pair of such wear strips 42 along the opposite sides of the extension slot 38 and a second pair of wear strips 42 along opposite sides of the housing slot 40. These wear strips may be secured in position in any convenient way, as by screws or rivets 44.

Indicated at 46 and 48 in FIGURE 2 are a pair of transparent visors, or lenses as they are commonly called. Each visor 46 and 48 is curved both horizontally and vertically to match the curvature of the visor housing 22. The opposite ends of each visor, therefore, curve rearwardly like the rearwardly curving ends of the visor housing. As is evident from FIGURE 2, the visor housing wall 24 and the visors 46 and 48 are circularly curved, in each vertical plane parallel to the fore and aft plane of symmetry of the helmet 10, about a common axis extending normal to said planes. The two end edges 50 (only one shown) of each visor 46 and 48 is also circularly curved about said common axis.

Secured to the inner surface of each end of the visor housing wall 24 are a pair of tracks 52 and 54 which are circularly curved about the common axis of curvature of the housing wall 24 and the visors 46 and 48. The outwardly presented surfaces of these tracks are recessed adjacent the forward edges of the tracks, in the manner shown in FIGURE 3, whereby each pair of tracks defines therebetween a circularly curved inner guideway 56 for slideably receiving the adjacent, circularly curved end of the inner visor 48, and each outer track 54 and the adjacent end of the visor housing wall 24 define therebetween an outer, circularly curved track 58 slideably receiving the adjacent, circularly curved end of the outer visor 46. The inner surfaces of the inner tracks seat against the outer surface of the helmet 10. The tracks 52 and 54, therefore, position the visors 46 and 48 in spaced relation and slideably support each visor for rotation between its retracted position, shown in solid lines in FIGURE 2, wherein the respective visor is contained within the visor housing 22, and an extended position, such as the extended position of the visor 46 shown in phantom lines in FIGURE 2, wherein the respective visor is disposed in front of the forward face opening in the helmet 10, and thereby extends across the line of sight of the person wearing the helmet.

Secured at its forward end to the center of the upper edge of the inner visor 48, as by a rivet 60, is a curved tang 62 which extends rearwardly from the visor through the channel 35 in the mounting extension 28. Fixed to the rear end of the upper surface of this tang is a screw 64 having an enlarged annular shoulder 66 below and seating upwardly against the undersurface of the upper extension wall 36, and an intermediate, reduced diameter portion 68 positioned in the extension of slot 38. The threaded shank of the screw 64 projects above the extension wall 36 and mounts a thumb nut 70. It is apparent from the preceding description that the inner visor 48 may be shifted between its extended and retracted positions by loosening the nut 70 and sliding the latter along the mounting extension slot 38. The visor may be retained in fixed position by retightening the thumb nut. The wear strips 42 and the mounting extension 28 are provided to prevent the thumb nut 70 from wearing the upper extension wall 36 when the body of the visor construction is made from plastic.

A second clamp screw 64 is secured to the center of the upper edge of the outer visor 46. A threaded shank of this clamp screw extends through the slot 40 in the visor housing 22 and mounts a thumb nut 70. Accordingly, visor 46, like visor 48, may be shifted between its extended and retracted positions by loosening the thumb nut 70 for the visor 46 and moving the latter along the housing slot 40. The visor 46 may be retained in fixed position by retightening its thumb nut 70.

According to the present invention, the two visors 46 and 48 are provided with different light transmission characteristics. For example, one visor may be clear to serve merely as a wind barrier or shield for the wearer of a helmet and the other visor may be tinted to serve both as a wind shield and as a light filter. In this case, the tinted visor is extended and the plain visor is retracted when the ambient light intensity is sufficiently high to require attenuation of the light transmitted to the wearer's eyes in order to maintain the transmitted light intensity at the proper level for eye comfort. When the ambient light intensity is sufficiently low to not require such attenuation, the tinted visor may be retracted and the plain visor may be extended. Alternatively, both visors may be tinted in such a way as to afford them with different light transmission characteristics, such that one visor effects more attenuation of the transmitted light than the other visor. In this case, the visors may be selectively individually extended, or both visors may be simultaneously extended, depending upon the ambient light intensity. Such a dual tinted visor arrangement obviously would provide the present visor construction with three different effective light transmission characteristics, thereby to adapt the present visor construction to use in a wide range of ambient light conditions. It is apparent, of course, that while the illustrated embodiment of the invention is equipped with two visors, additional visors could be provided, if desired.

When the visors 46 and 48 are in their retracted positions, they are contained within the visor housing 22 and thereby shielded against damage. This feature of the invention is particularly necessary and useful when the visors are constructed of plastic, as they commonly are, in order to avoid scratching the visors when the helmet is taken off and laid on a supporting surface.

It is apparent that the illustrated visor construction 20 may be made and sold separately as a visor attachment for an existing helmet. In this case it is a simple matter to attach the visor to the helmet by the screws 32. Alternatively, the present visor construction may be made as an integral part of the helmet during the construction of the helmet.

While the invention has been described in connection with the visor construction having visors of different light transmission characteristics which are intended to be used alternately or simultaneously according to the ambient light conditions, it may be desirable in some applications to retain one of the visors in its retracted position as a spare visor in the event the other visor is damaged. In this case, both visors might have the same light transmission characteristics.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

We claim:

1. A visor construction comprising a helmet curved in a fore and aft and in a transverse direction in conformance generally with the shape of a human head and adapted to be supported on the head, and a pair of transparent visors movably mounted on said helmet for movement of each visor between an extended position in the line of sight of the wearer and a retracted position out of said line of sight, said visors being curved in a fore and aft and in a transverse direction on different radii of curvature whereby to space said visors at different locations relative to the exterior of the helmet, said visors being free of engagement with each other, and means mounting said visors on the helmet whereby either or both of said visors are movable to extended position in the line of sight of the wearer independently of the other.

2. A visor construction according to claim 1 wherein said visors have different light transmission characteristics.

3. A visor construction comprising a body to be supported on the head including a housing to extend across the front of the head above the normal line of sight of the wearer, said housing being open along its normally lower side, a pair of transparent visors, means mounting said visors on said housing for independent movement of each visor between a retracted position in the housing and out of said line of sight and an extended position below said housing and in said line of sight, and means accessible externally of said housing for independently extending and retracting said visors.

4. A visor construction comprising a body to be supported on the head including a housing to extend across the front of the head above the normal line of sight of the wearer and an extension projecting rearwardly from said housing approximately midway between the ends of the housing, a pair of transparent visors, means mounting said visors on said housing for independent movement of each visor between a retracted position in the housing and out of said line of sight and an extended position below said housing and in said line of sight, said housing including a front wall disposed adjacent one visor, said front wall having a slot therein extending parallel to the direction of movement of said visors between said extended and retracted positions, and means secured to said one visor and projecting through said slot to a location exterior relative to said housing for operating said one visor between said positions and securing said one visor in fixed position, said extension having a slot therein extending parallel to said direction of movement of said visors and means secured to the other visor and projecting through said last identified slot to a location exterior with respect to said extension for operating said other visor between said positions and securing said other visor in fixed position.

5. A visor construction according to claim 4 wherein said visor operating means comprise clamp screw means.

6. A visor construction according to claim 4 including means on said body for securing the latter to a helmet or the like.

7. A visor construction according to claim 4 wherein the ends of said housing and the ends of said visors curve rearwardly, and said visor mounting means comprise track means on the inner surface of each end of said housing defining inner and outer guideways slideably receiving said ends of said visors, respectively.

8. In combination, a helmet having a front face opening, and a visor construction mounted on said helmet including a housing extending across the front of the helmet above said face opening and out of the normal line of sight of the wearer, said housing being open along its normally lower side, a pair of transparent visors, means mounting said visors on said housing for independent movement of each visor between a retracted position in said housing and out of said normal line of sight and an extended position in front of said face opening and in said normal line of sight, and means accessible externally of said housing for independently extending and retracting said visors.

9. In combination, a helmet having a front face opening, and a visor construction mounted on said helmet including a housing extending across the front of said helmet above said face opening and out of the normal line of sight of the wearer, an extension extending rearwardly from said housing between the ends of the housing and over the crown of the helmet, said extension containing a channel opening to said housing, a pair of transparent visors, means mounting said visors on said housing for independent movement of each visor between a retracted position within said housing and out of said normal line of sight and an extended position in front of said face opening and in said normal line of sight, said housing having a forwardly presented wall and said wall and extension having slots extending parallel to the direction of movement of said visors between said positions, means secured to the visor adjacent said wall and projecting through the slot in said wall for operating said latter visor between its extended and retracted positions and securing the latter visor in fixed position, and means secured to the other visor and projecting through the slot in said extension for operating said other visor between its extended and retracted positions and securing said other visor in fixed position.

10. A combination according to claim 9 wherein said visors have different light transmission characteristics.

11. A visor constructed in accordance with claim 1 including tightening means acting between each respective visor and the helmet to hold said visors in selected positions.

12. A visor constructed in accordance with claim 1 including shielding means on the body overlying said visors when said visors are in retracted position.

(References on following page)

References Cited by the Examiner

UNITED STATES PATENTS

| | | | |
|---|---|---|---|
| 2,153,714 | 4/1939 | Fleming et al. | 2—8 |
| 2,277,090 | 3/1942 | Feiler | 2—8 |
| 2,363,461 | 11/1944 | Huntsman | 2—8 |
| 2,419,649 | 4/1947 | Lieg | 2—8 |
| 3,110,034 | 11/1963 | Aileo | 2—6 |
| 3,112,490 | 12/1963 | Malcom | 2—8 |
| 3,117,322 | 1/1964 | Goldman | 2—6 |

JORDAN FRANKLIN, *Primary Examiner.*

FRANK J. COHEN, J. R. BOLER, *Assistant Examiners.*